United States Patent [19]

Slater

[11] Patent Number: 4,884,838
[45] Date of Patent: Dec. 5, 1989

[54] COMBINED AIR FOIL AND LOADING RAMP FOR PICKUP TRUCK

[76] Inventor: Frank W. Slater, P.O. Box 186, Durant, Okla. 74702

[21] Appl. No.: 296,781

[22] Filed: Jan. 13, 1989

[51] Int. Cl.$^4$ .............................................. B62D 35/00
[52] U.S. Cl. ................................ 296/180.1; 296/57.1; 296/24.1; 296/61; 296/26
[58] Field of Search ....................... 296/180.1, 26, 57.1

[56] References Cited

U.S. PATENT DOCUMENTS

| | | | |
|---|---|---|---|
| 4,451,075 | 5/1984 | Canfield | 296/180.1 |
| 4,472,639 | 9/1984 | Bianchi | 296/26 |
| 4,506,870 | 3/1985 | Penn | 296/180.1 |
| 4,585,263 | 4/1986 | Hesner | 296/180.1 |
| 4,585,265 | 4/1986 | Mader | 296/180.1 |
| 4,735,454 | 4/1988 | Bernard | 296/57.1 |

Primary Examiner—Robert R. Song
Attorney, Agent, or Firm—Fleit, Jacobson, Cohn, Price, Holman & Stern

[57] ABSTRACT

A combined air foil and loading ramp for a pickup truck which includes a mounting bracket attached to the upper edge of a pickup truck tailgate with a rigid panel connected thereto for positioning in downwardly and forwardly inclined relation when the tailgate is in a vertical, closed position, positioned in overlying engagement with the upper surface of the tailgate or extending rearwardly from the upper edge of the tailgate in a generally horizontal position to form a loadbed extension when the tailgate is in a horizontal open position and extending downwardly and rearwardly in an inclined direction to form a loading ramp when the tailgate is in downwardly inclined relation to the loadbed of the pickup truck. The combined air foil and loading ramp converts the tailgate of a pickup truck to an air foil causing the air to flow over the closed tailgate for increasing the miles per gallon of gasoline consumed by the pickup truck engine, acts as a storage box for protecting tools or other items stored under the panel when the tailgate is closed, serves as an extension for the loadbed of the pickup when the tailgate is in a horizontal position and becomes an inclined loading ramp when the tailgate is positioned in the downwardly inclined position.

9 Claims, 2 Drawing Sheets

COMBINED AIR FOIL AND LOADING RAMP FOR PICKUP TRUCK

BACKGROUND OF THE INVENTION

1. Field of the Invention

The present invention generally relates to a combined air foil and loading ramp for a pickup truck which includes a mounting bracket attached to the upper edge of a pickup truck tailgate with a rigid panel connected thereto for positioning in downwardly and forwardly inclined relation when the tailgate is in a vertical, closed position, positioned in overlying engagement with the upper surface of the tailgate or extending rearwardly from the upper edge of the tailgate in a generally horizontal position to form a loadbed extension when the tailgate is in a horizontal open position and extending downwardly and rearwardly in an inclined direction to form a loading ramp when the tailgate is in downwardly inclined relation to the loadbed of the pickup truck. The combined air foil and loading ramp converts the tailgate of a pickup truck to an air foil causing the air to flow over the closed tailgate for increasing the miles per gallon of gasoline consumed by the pickup truck engine, acts as a storage box for protecting tools or other items stored under the panel when the tailgate is closed, serves as an extension for the loadbed of the pickup when the tailgate is in a horizontal position and becomes an inclined loading ramp when the tailgate is positioned in the downwardly inclined position.

2. Information Disclosure Statement

Various attachments have been provided for pickup trucks including loading ramps, screen-type tailgates for reducing air drag and an inclined panel between the side walls of a pickup truck body with the panel being disposed adjacent the tailgate. The following U.S. Patents are relevant to this invention but do not disclose the same or equivalent structure.

3,642,156
3,976,209
4,215,896
4,353,589
4,372,601
4,451,075
4,475,759
4,506,870
4,735,454

SUMMARY OF THE INVENTION

The present invention generally relates to a combined air foil and loading ramp for a pickup truck having a pivotal tailgate movable between a vertical closed position, a horizontal, rearwardly extending open position and a rearwardly and downwardly inclined loading position with the air foil and loading ramp including a U-shaped or channel-shaped bracket structure telescopically engaged with and overlying the free edge of the tailgate and being rigidly secured thereto together with a rigid panel attached to the bracket and being positioned in a downwardly and forwardly inclined position with the free edge thereof terminating adjacent the bottom surface of the loadbed of the pickup truck when the tailgate is in vertical, closed position to deflect air upwardly thereby providing an air foil for reducing drag and increasing downward thrust on the vehicle body for increased traction.

Another object of the invention is to provide a combined air foil and loading ramp in accordance with the preceding object in which the rigid panel is oriented in a generally horizontal position to form an extension of the bottom of the loadbed of the pickup truck body when the tailgate is pivoted rearwardly to a substantially horizontal, open position to increase the length of the loadbed of the pickup truck body.

A further object of the invention is to provide a combined air foil and loading ramp in accordance with the preceding objects in which the rigid panel extends downwardly and rearwardly from the pickup truck body as an extension of the tailgate when the tailgate is pivoted to a downwardly and rearwardly inclined loading position thereby facilitating movement of a load into the pickup truck loadbed.

A still further object of the invention is to provide a combined air foil and loading ramp in which the panel is pivotally connected to a bracket mounted on the free edge of the tailgate and is constructed of two components that are adjustably connected in overlapping relation to vary the length from front to rear for enabling the device to be installed in pickup truck loadbeds having different interior width dimensions.

Still another feature of the invention is to provide a combined air foil and loading ramp which will provide a protective area for tool boxes and the like when the tailgate is in vertical, closed position with the combined air foil and loading ramp being relatively simple in construction, easy to attach to pickup truck bodies without any alteration of the tailgate or any other component of the pickup truck body.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
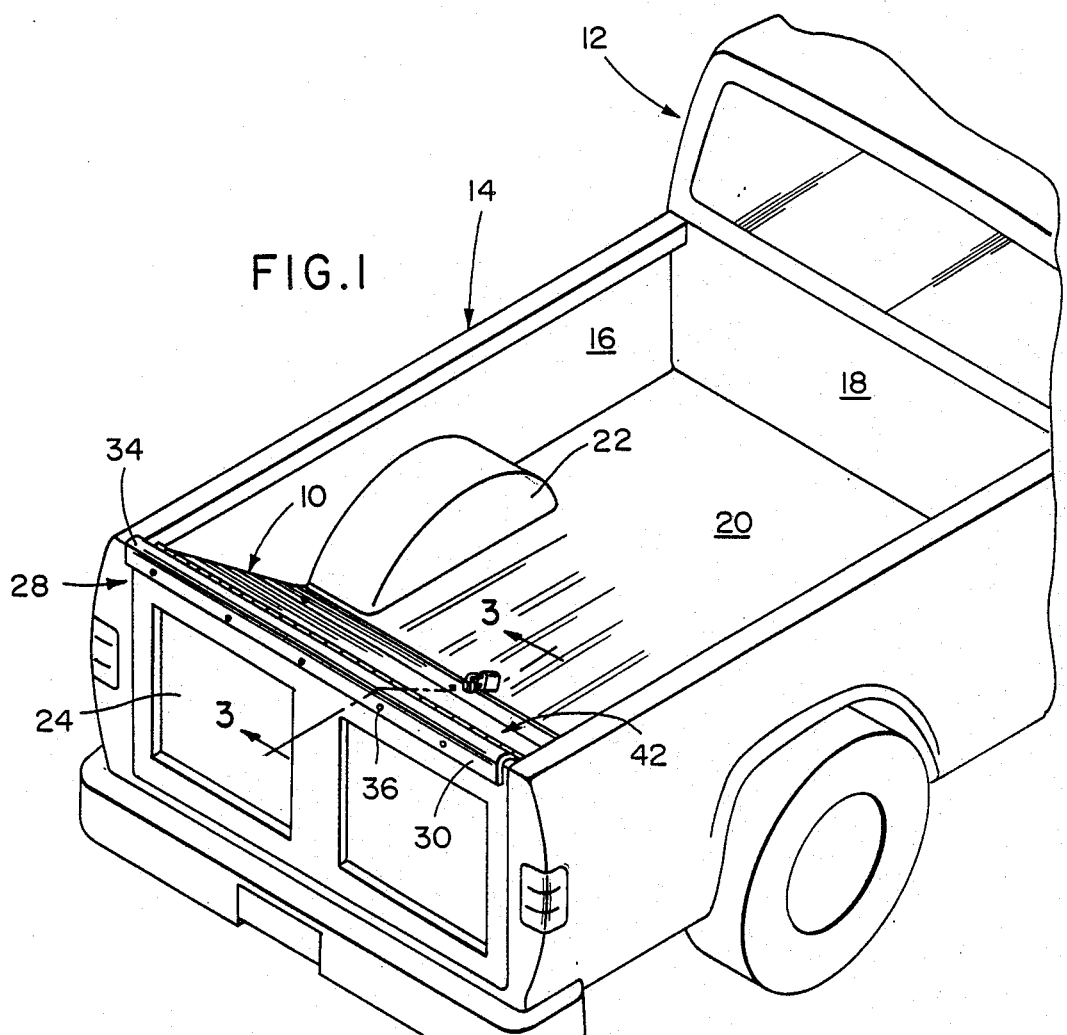
FIG. 1 is a perspective view of a pickup truck with the combined air foil and loading ramp of the present invention installed on the tailgate.

Referring now specifically to the drawings, the combined air foil and loading ramp of the present invention is generally designated by reference numeral 10 and is installed on a pickup truck 12 including a loadbed 14 having side walls 16, a front wall 18, a floor 20 with or without wheel wells 22 and a tailgate 24 that is pivotally supported along its bottom edge and provided with latch structures and flexible supporting elements 26 such as chains or cables which enable the tailgate to be positioned in vertical, closed position as illustrated in FIG. 1, a horizontal, open position as illustrated in FIG.

Figure 2:
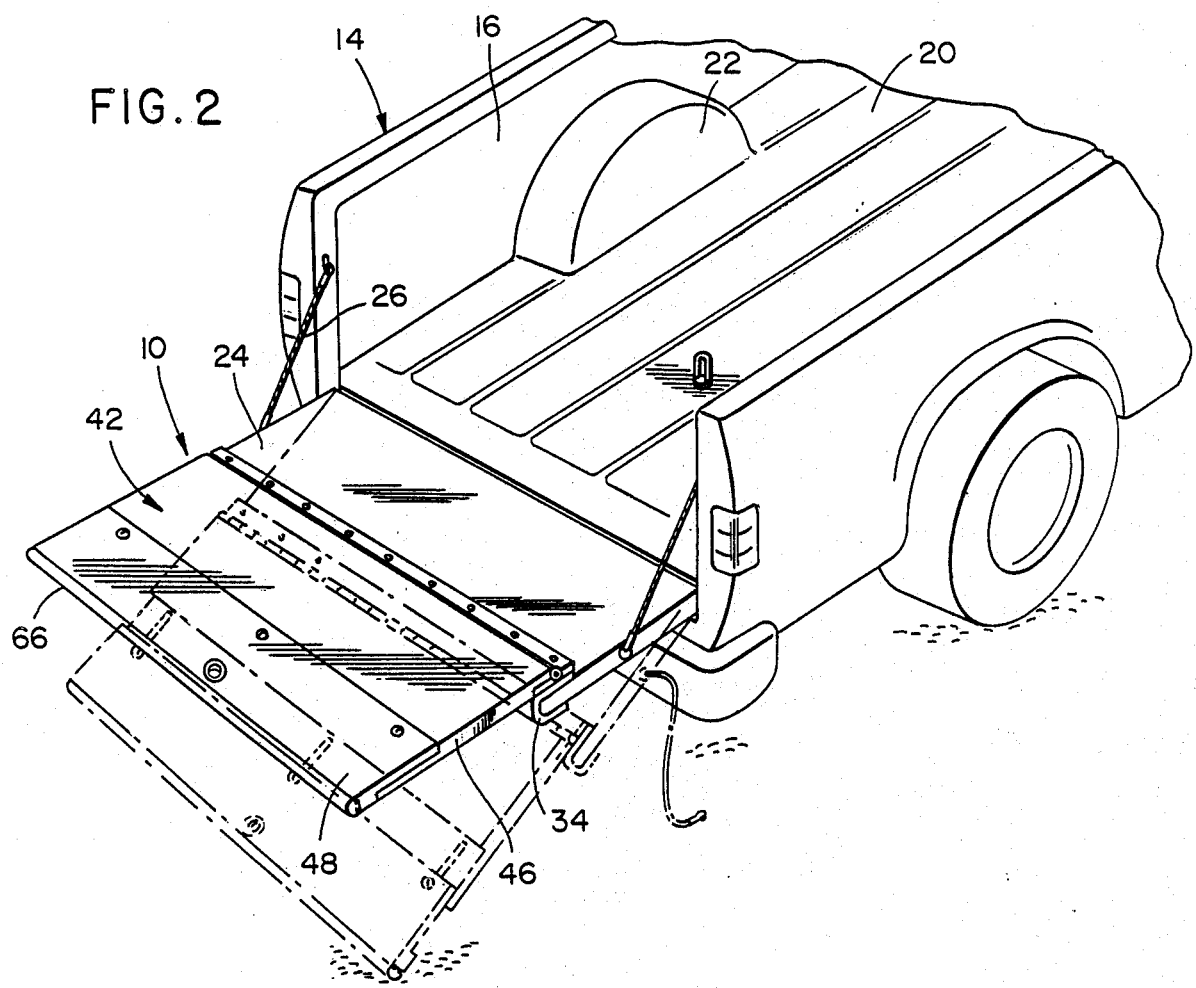
FIG. 2 is a perspective view similar to FIG. 1 but illustrating the tailgate in generally open, horizontal position and in a downwardly inclined loading position illustrated in broken lines.

3 and a downwardly inclined loading position as illustrated by broken lines in FIG. 2. The pickup truck described above is conventional. The combined air foil and loading ramp 10 of the present invention can be quickly and easily attached to the tailgate 24 which enables the present invention to be utilized both as an air foil, loadbed extension and loading ramp in a manner described in more detail hereinafter.

The combined air foil and loading ramp includes a generally U-shaped downwardly opening bracket 28 which includes substantially parallel legs 30 and 32 rigidly interconnected by a web or bight portion 34. The bracket 28 straddles and protects the upper edge of the tailgate 24 and telescopes downwardly over the upper edge of the tailgate 24 in generally close fitting relation thereto. Screws, bolts or other fastening means 36 extend through the leg 32 along the front surface of the tailgate and penetrate into and are secured to the tailgate or the fasteners 36 may be in the form of threaded clamp or set screws that clamp the bracket rigidly and securely onto the tailgate 24. The bracket 28 is of rigid construction and is preferably constructed of steel, cast aluminum or other rigid material.

Figure 3:
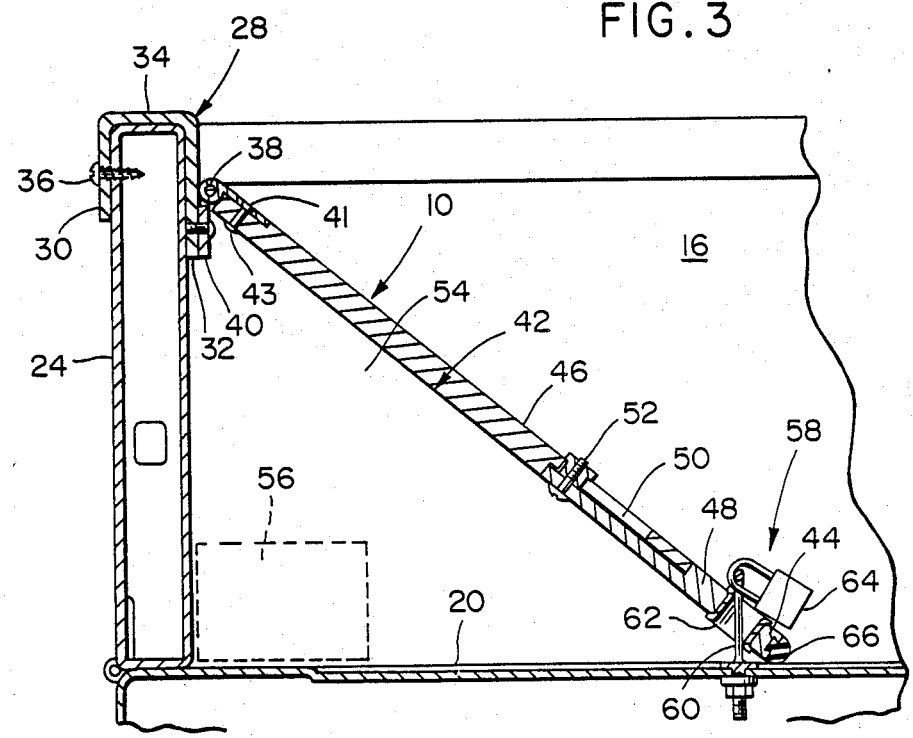
FIG. 3 is a vertical, sectional view, on an enlarged scale, taken substantially upon a plane passing along section line 3—3 on FIG. 1 illustrating the structure of the bracket and rigid panel, the association of the panel with the tailgate and floor of the loadbed.

The forward or inner leg 32 of the bracket 28 is provided with a hinge 38 having one flange 40 rigidly secured to the leg 32 of the bracket 28 and the other flange 41 secured to the upper end edge of a rigid, generally rectangular panel or plate 42 by fasteners 43 which extends downwardly and inwardly in relation to the tailgate 24 with the free horizontal edge 44 of the panel 42 terminating adjacent to and preferably in engagement with the floor 20 of the pickup truck loadbed 14 as illustrated in FIG. 3. The panel 42 includes two rigid panel components 46 and 48 which telescopically overlap with the overlapping portions including a pair of slots 50 in registry with each other. The slots 50 receive clamp bolts 52 to secure the panel components 46 and 48 in adjusted relation thereby varying the length to fit pickup truck loadbeds and tailgates of different dimensional characteristics and to provide a loadbed extension and loading ramp of different lengthwise dimensions.

When the panel 42 is in the downwardly inclined position as illustrated in FIG. 3 and the tailgate 24 is in a vertical, closed position, the panel 42 converts the tailgate of the pickup truck to an air foil causing the air to flow over the closed tailgate thereby reducing drag and increasing gas mileage and downward thrust on the traction wheels of the pickup truck. Also, the area under the panel 42 designated by reference numeral 54 is a protected and concealed area which provides a storage box or space for receiving a tool box, storage box 56, tools or other items desired to be protected during periods of inclement weather and also concealed from sight and prevents theft of such items by the provision of a lock structure 58. The lock structure includes an eye bolt 60 rigidly affixed to the floor 20 and which extends upwardly through an aperture 62 in the panel component 48 and receives the hasp of a padlock 64.

When the panel 42 is in the solid line position illustrated in FIG. 2, it forms an extension of the pickup truck loadbed with the panel 42 enabling relatively light loads to be supported on the extension and effectively increasing the load carrying capacity of the pickup truck. As illustrated in FIG. 1, the side-to-side dimension of the panel 42 is such that it will be positioned between the side walls 16 of the pickup truck loadbed 14 but the panel 42 is completely free of the side walls 16 and the floor 20 so that the tailgate can pivot to an open position in a conventional manner after the locking structure 58 has been released. As the tailgate swings toward horizontal position, the panel 42 will fall downwardly and rest on the upper surface of the tailgate which enables loading and unloading in the usual way. The panel 42 can be pivoted about hinge 38 and positioned in the full line position or in the downwardly inclined position.

When the tailgate 24 has been pivoted downwardly to an inclined position which is facilitated by disconnection of the flexible support members 26 in a well-known manner with the tailgate usually resting against the bumper 56. In this position, the panel 42 along with the tailgate 26 provides a loading ramp for the pickup truck body 14 thus facilitating the loading of certain loads such as wheeled vehicles and the like with adjustment of the length of the panel in some instances enabling the free edge 44 of the panel 42 to engage the ground surface so that lawnmowers, all terrain vehicles and the like can be easily loaded into the pickup truck. The free edge 44 of the panel 42 is provided with a rubber or plastic cap or insert 66 in the edge. The panel 42 may be constructed of steel, aluminum, plastic, fiberglass or the like depending upon the use and load requirements. The bracket 28 being attached to the top edge of the tailgate also protects the top of the tailgate by eliminating denting and scratching or marring of the painted surface of the top of the tailgate. The panel 42 may also be constructed of exterior plywood painted or encapsulated in a waterproof material having a color compatible with the color of the pickup truck body.

Figure 4:
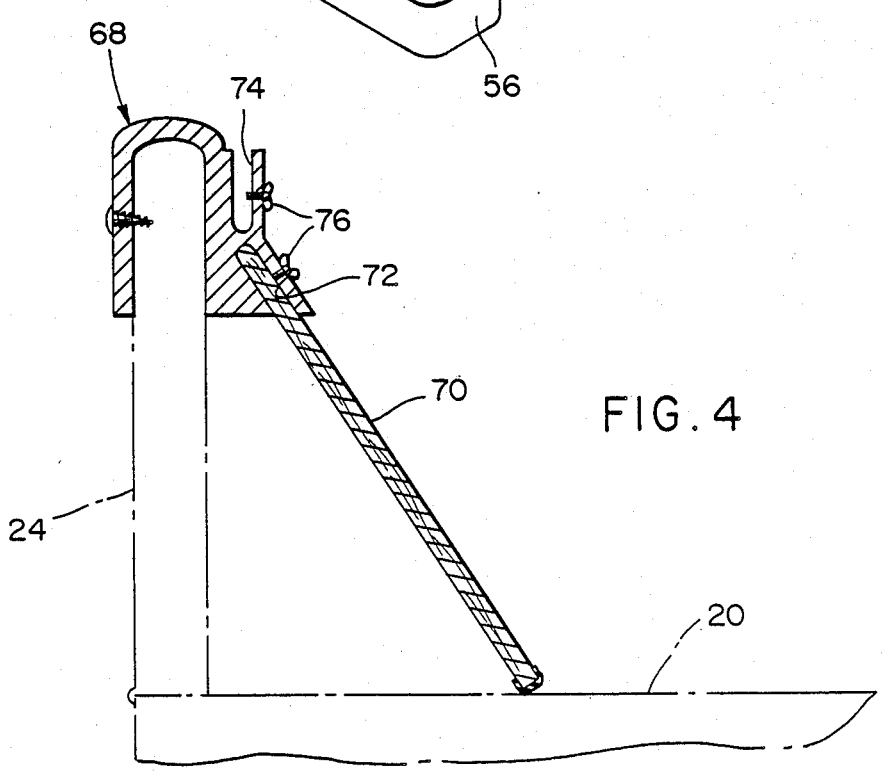
FIG. 4 is a fragmental, sectional view similar to FIG. 3 but illustrating a bracket to support the panel in selected positions.

FIG. 4 illustrates another embodiment of the invention in which a U-shaped bracket 68 fits over the upper edge of the tailgate 24 and secured thereto by fastening bolts, screws, clamp bolts and the like which may extend through either leg of the bracket 68. In this embodiment of the invention, a rigid panel 70 which is the same as panel 42 and is associated with the tailgate and bracket in the same manner as in FIGS. 1-3 but, in this construction, the panel 70 is connected to the upper inner edge of the bracket 68 by a pair of grooves 72 and 74 which enables the free edge of the panel 70 to rest against the floor 20 when the tailgate is in the vertical, closed position and the panel 70 is positioned in groove 72. When the panel 70 is positioned in groove 74 and the tailgate 24 is moved to open position, the panel 70 will be parallel to the inner surface of the tailgate as illustrated in dotted line so that the panel 70 when in the position forming an extension of the inner surface of the tailgate will form an extension of the loadbed and tailgate when the tailgate is horizontal and also form a loading ramp when the tailgate is lowered to the downwardly inclined position in a manner similar to that illustrated in dotted line in FIG. 2. The panel 70 operates in the same manner as the rigid panel 42 with the grooves 72 and 74 facilitating positioning of the panel 70 from the downwardly inclined position when the tailgate is closed to the extension forming position when the tailgate is either horizontal or downwardly inclined clamp screws 76 are provided to releasably secure the edge of the adjustable panel 70 in the grooves 72 and 74.

With the present invention, the tailgate is protected, the air drag is reduced with the air foil formed by the inclined panel causing air flow upwardly over the tailgate to reduce drag and thus increase gasoline mileage and to increase downward force on the traction wheels of the pickup truck. When the tailgate is moved to horizontal open position, the forward edge of the panel will fall downwardly to a horizontal position overlying the upwardly facing surface of the tailgate thereby providing a flat surface which enables the pickup truck to be loaded or unloaded in the usual manner. The panel 42 can also be pivoted outwardly to form a continuation and extension of the floor 20 of the loadbed and the upper surface of the tailgate 24 when it is in horizontal position. When the tailgate is pivoted to a downwardly inclined position by disconnecting or adjusting the straps, cables or chains 26, the panel 42 still forms an extension of the tailgate surface to form a loading ramp for lawnmowers and other similar wheeled vehicles or other types of loads.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A combined air foil and loading ramp for a pickup truck having a tailgate pivotally movable between a vertical, closed position and an open position comprising a bracket positioned on the upper edge of the tailgate, means securing the bracket to the tailgate for movement therewith, a rigid panel, means connecting the panel to the bracket for positioning the panel in a downwardly and forwardly inclined position with the free edge of the panel terminating adjacent the floor of a loadbed of a pickup truck to form an air foil when the tailgate is in vertical position, said panel forming an extension of the tailgate surface when the tailgate is in open position to form a loading ramp.

2. The structure as defined in claim 1 wherein said means connecting the panel to the bracket includes a hinge structure enabling the panel to pivot from a downwardly and forwardly inclined position when the tailgate is in vertical, closed position to a position forming an extension of the loadbed and tailgate surface when the tailgate is in open position.

3. The structure as defined in claim 1 wherein said panel is constructed of two components, means telescopically adjustably connecting said components to enable the distance between the top edge of the tailgate to the free edge of the panel to be adjusted to fit pickup trucks having different dimensions.

4. The structure as defined in claim 1 wherein said bracket is of U-shaped configuration and includes parallel legs interconnected by a bight portion with the legs telescoped over the upper edge of the tailgate when in vertical position with the bight portion overlying the top edge of the tailgate to protect the tailgate from dents and protect the paint from being scratched along the top edge of the tailgate.

5. The structure as defined in claim 4 wherein the leg of said bracket engaged with the forward surface of the tailgate when the tailgate is in vertical position includes a downwardly and forwardly inclined groove and a vertical, upwardly opening groove receiving an edge of the panel with fastening devices clamping the panel rigidly in place and forming said means connecting the panel to the bracket.

6. The structure as defined in claim 1 wherein said panel includes a free edge having a resilient insert engaged with the floor of the loadbed to deflect air upwardly to form an air foil to reduce drag and increase gas mileage and also to produce downward force on the traction wheels of the pickup truck.

7. The structure as defined in claim 1 wherein said bracket is provided with a downwardly opening recess telescopically received over the upper edge of a tailgate, said means securing the bracket to the tailgate including fasteners extending through the bracket into engagement with the tailgate.

8. The structure as defined in claim 1 wherein said means connecting the panel to the bracket includes a downwardly inclined and downwardly opening groove receiving an edge of the panel and a second groove opening outwardly and upwardly in parallel relation to the tailgate for receiving the panel when in the extension forming position.

9. The structure as defined in claim 2 together with lock means releasably connecting the free edge of the panel to the floor of the loadbed to provide a lockable storage area enclosed by the floor, tailgate and rigid panel for storage of tools, tool box and the like.

* * * * *